US008576475B2

(12) United States Patent
Huang et al.

(10) Patent No.: US 8,576,475 B2
(45) Date of Patent: Nov. 5, 2013

(54) MEMS SWITCH

(75) Inventors: Sung-Hui Huang, Hsinchu (TW); Po-Wen Hsiao, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 231 days.

(21) Appl. No.: 13/209,769

(22) Filed: Aug. 15, 2011

(65) Prior Publication Data

US 2011/0297519 A1 Dec. 8, 2011

Related U.S. Application Data

(62) Division of application No. 12/556,671, filed on Sep. 10, 2009, now Pat. No. 8,023,174.

(51) Int. Cl.
*G02B 26/00* (2006.01)

(52) U.S. Cl.
USPC .......................................... 359/290; 359/291

(58) Field of Classification Search
USPC .......................................... 359/245, 290, 291
See application file for complete search history.

(56) References Cited

U.S. PATENT DOCUMENTS

| | | | |
|---|---|---|---|
| 7,535,621 B2 | 5/2009 | Chiang | |
| 2002/0196517 A1 | 12/2002 | Nimura | |
| 2008/0158645 A1 | 7/2008 | Chiang | |
| 2008/0165122 A1 | 7/2008 | Duthaler et al. | |
| 2011/0234603 A1* | 9/2011 | Chui et al. | 345/501 |

FOREIGN PATENT DOCUMENTS

| | | | |
|---|---|---|---|
| CN | 1389752 | A | 1/2003 |
| CN | 1726428 | A | 1/2006 |
| CN | 101957532 | B | 10/2012 |
| TW | I233916 | B | 6/2005 |

OTHER PUBLICATIONS

Taiwan Official Action issued on Feb. 21, 2013.
China official action (CN101957532B) issued on Oct. 3, 2012.

* cited by examiner

*Primary Examiner* — James Jones
(74) *Attorney, Agent, or Firm* — Chun-Ming Shih

(57) ABSTRACT

A micro electro-mechanical system (MEMS) switch includes an active device, an immovable metal layer and a movable metal layer is provided. The immovable metal layer is disposed on the active device and the movable metal layer is disposed above the immovable metal layer. Accordingly, an insulating cavity is formed between the immovable metal layer and the movable metal layer. Further, the active device is capable of driving the movable metal layer. Compare to thin film transistor, since the operation performance of the MEMS switches would not affected by carrier mobility and on-off current ratio, display performance of the display device can be easily improved.

8 Claims, 4 Drawing Sheets

MEMS SWITCH

CROSS-REFERENCE

This application is a divisional application of U.S. patent application Ser. No. 12/556,671, filed on Sep. 10, 2009.

BACKGROUND

The invention relates to a switch, and more particular, to a micro electro-mechanical system (so-called MEMS) switch.

DESCRIPTION OF THE RELATED ART

With progress of the display technique, more and more electrical products, such as computer, television, monitoring apparatuses mobile phones and digital cameras etc., are equipped with display devices.

In the present days, thin film transistors are configured in mostly display devices have as driving elements for controlling the operation of display medium. Since the mobility of carries of the inorganic semiconductor materials is larger than that of the organic semiconductor materials, the inorganic semiconductor materials, such as amorphous silicon, is used in conventional thin film transistors. Also, because the amorphous thin film transistors can be fabricated in low temperature, it has become the main stream in the thin film transistor market.

However, the display performance of the display device is requested more and more, so that the display device has to be provided with the advantages of higher carrier mobility or on-off current ratio. Accordingly, the amorphous thin film transistors could not satisfy the requests of the display device in next generation.

BRIEF SUMMARY

Therefore, the invention is directed to a MEMS switch for improving the display performance of display device using the same.

The invention provides a MEMS switch including an active device, an immovable metal layer and a movable metal layer. The immovable metal layer is disposed on the active device and the movable metal layer is disposed above the immovable metal layer. Accordingly, an insulating cavity is formed between the immovable metal layer and the movable metal layer. Further, the active device is capable of driving the movable metal layer.

Since the material of the MEMS switches is conductive, and the on/off status of the MEMS switches is operated by controlling electric field to make whether the metal layers disposed at different layer electrically connecting to each other or not, the MEMS switches would not have the problems about carrier mobility and the on-off current ratio. This shows that the display device uses the MEMS switches of the invention can increase the display performance thereof. Therefore, the requests in use of the display device in new generation would be satisfied.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
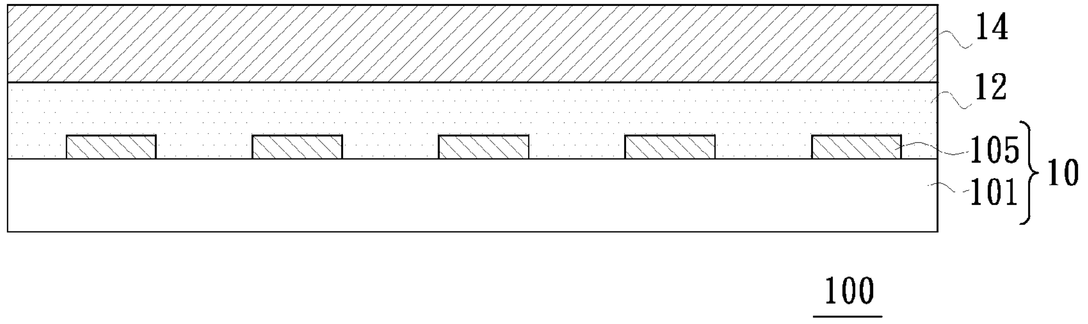
FIG. 1 is a schematic cross-section view of the display device according to an embodiment of the invention.
Figure 2:
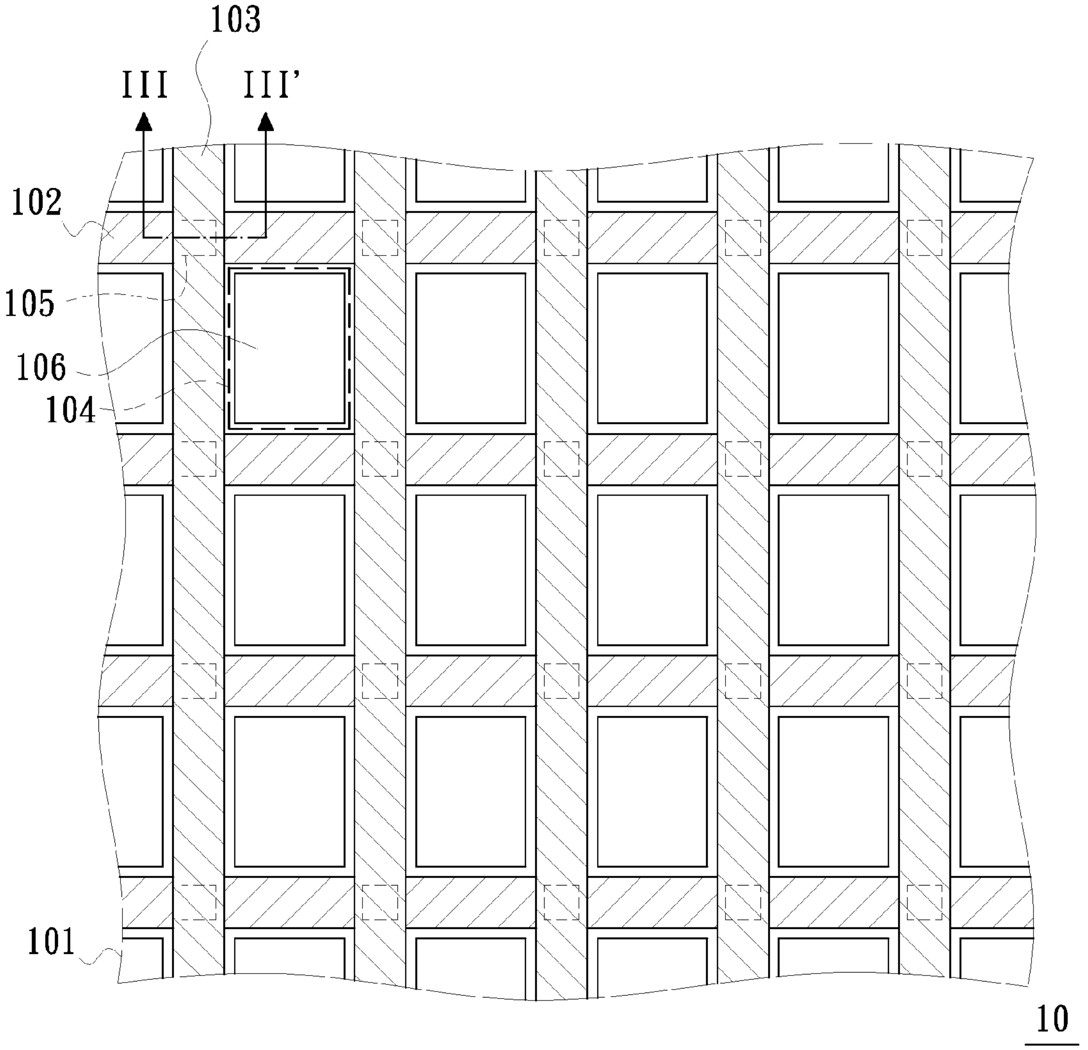
FIG. 2 is a schematic top view of a MEMS array substrate of the display device shown in FIG. 1.

FIG. 1 is a schematic cross-section view of the display device according to an embodiment of the invention. FIG. 2 is a schematic top view of a MEMS array substrate of the display device shown in FIG. 1. Referring to FIG. 1, the display device 100 includes a MEMS array substrate 10, a display medium layer 12 and a transparent substrate 14. The transparent substrate 14 is disposed above the MEMS array substrate 10, and the display medium layer 12 is disposed between the MEMS array substrate 10 and the transparent substrate 14. Specifically, the display medium layer 12 is, for example, an electro-phoretic layer or a liquid crystal layer.

Referring to FIG. 1 and FIG. 2, the material of the transparent substrate 14 is, for example, glass. The MEMS array substrate 10 includes a substrate 101, a plurality of first signal lines 102, a plurality of second signal lines 103, a plurality of MEMS switches 105 and a plurality of pixel electrodes 106. The first signal lines 102 are disposed on the substrate 101 in parallel with one another as well as the second signal lines 103. The second signal lines 103 intersect the first signal lines 102 and thus a plurality of pixel regions 104 are defined on substrate 101. The MEMS switches 105 are disposed at the intersections between the first signal lines 102 and the second signal lines 103, and the pixel electrodes 106 are disposed on corresponding one of the pixel regions 104 and electrically connected to the MEMS switch 105 corresponding thereto.

In this embodiment, the first signal lines 102 and the second signal lines 103 are, for example, data lines and scan lines respectively, but not limited hereto. In another embodiment, the first signal lines 102 may be data lines, and the second signal lines 103 may be scan lines.

Figure 3:
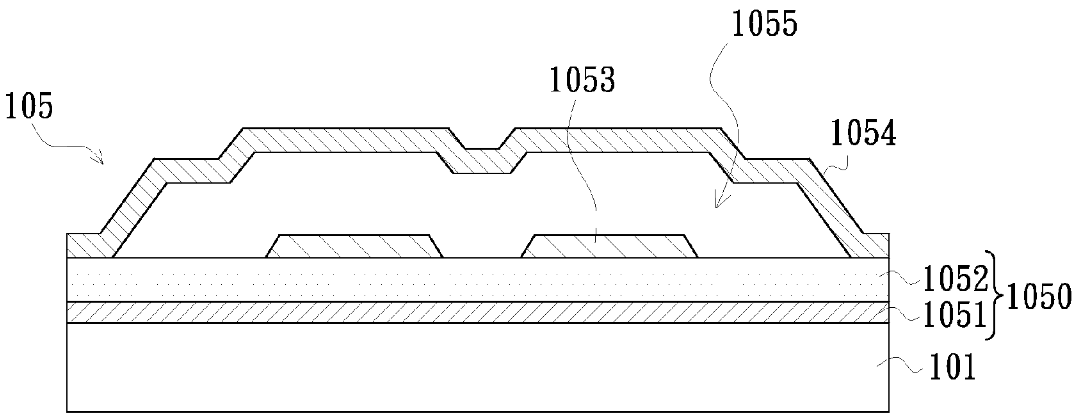
FIG. 3 is a schematic cross-section view along the line III-III' in the FIG. 2.

FIG. 3 is a schematic cross-section view along the line III-III' in the FIG. 2. Referring to FIG. 2 and FIG. 3, each MEMS switch 105 includes an active device 1050, an immovable metal layer 1053 and a movable metal layer 1054. The active device 1050 is capable of driving the movable metal layer 1054. In this embodiment, the active device 1050 includes a first metal layer 1051 and an insulating layer 1052. The first metal layer 1051 is disposed on the substrate 101 and electrically connected to corresponding one of the first signal lines 102. The insulating layer 1052 is disposed on the first metal layer 1051. The immovable metal layer 1053 is disposed on the insulating layer 1052 and electrically connected to corresponding one of the pixel electrodes 106. The movable metal layer 1054 is disposed above the immovable metal layer 1053 and electrically connected to corresponding one of the second signal lines 103. Specially, an insulating cavity 1055 is formed between the movable metal layer 1054 and the immovable metal layer 1053.

Figure 4:
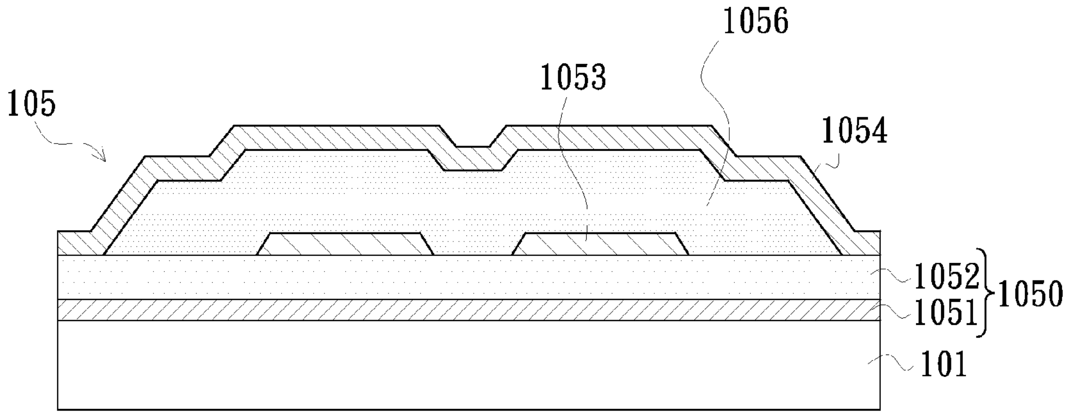
FIG. 4 is a schematic cross-section view of the MEMS switch shown in FIG. 3 during the manufacturing process thereof.

Further, the MEMS switch 105 is formed by forming the first metal layer 1051, the insulating layer 1052 and the immovable metal layer 1053 on the substrate 101 sequentially first. Then, a sacrificial layer 1056 is formed on the immovable metal layer 1052 and the movable metal layer 1054 is formed on the sacrificial layer 1056, as shown in FIG. 4. Later, the sacrificial layer 1056 is removed by gas etch, and thus the MEMS switch 105 shown in FIG. 3 is formed. The materials of the first metal layer 1051 and the immovable metal layer 1053 are, for example, silver, chromium, alloys of molybdenum and chromium, alloys of aluminum and neodymium or nickel boride. The material of the insulating layer 1052 is, for example, silicon oxide or silicon nitride. The material of the movable metal layer 1054 is magnetic metal, such as nickel/alloys of aluminum and neodymium or nickel boride/alloys of aluminum and neodymium.

Especially, for simplifying the manufacturing process of the MEMS array substrate 10, the first metal layer 1051 of each MEMS switch 105 may be formed at the same layer with the first signal lines 102, the immovable metal layer 1053 may be formed at the same layer with the pixel electrodes 106 and the movable metal layer 1054 may be formed at the same layer with the second signal lines 103. Accordingly, if the immovable metal layer 1053 is formed at the same layer with the pixel electrodes, the immovable metal layer 1053 is made of transparent conductive material, such as indium tin oxide (ITO), indium zinc oxide (IZO) or indium gallium zinc oxide (IGZO).

The MEMS switch described in the aforementioned embodiments would be taken to be an example to expound the operation of the display device of the invention.

Figure 5:
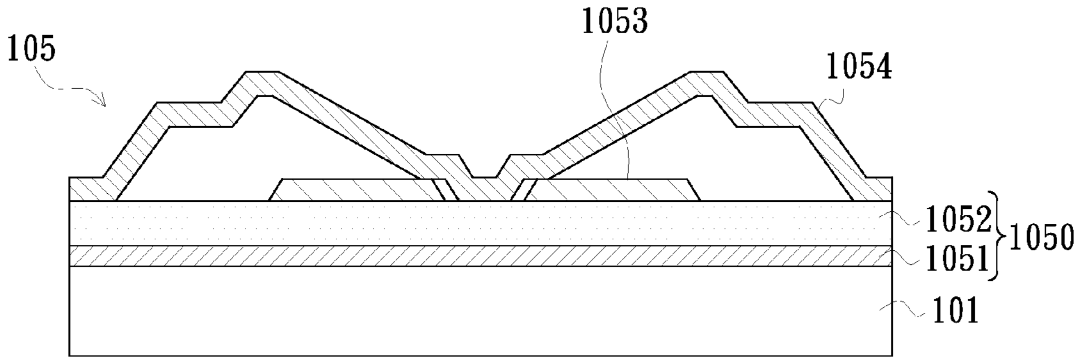
FIG. 5 is a diagram of the MEMS switch shown in FIG. 4 while there is a voltage differential between the movable metal layer and the first metal layer.

FIG. 5 is a diagram of the MEMS switch shown in FIG. 4 while there is a voltage differential between the movable metal layer and the first metal layer. Referring to FIG. 1, FIG. 2 and FIG. 5, a voltage differential between the first metal layer 1051 electrically connected to the first signal line 102 and the movable metal layer 1054 electrically connected to the second signal line 103 resulted from applying voltage to the first signal line 102 and the second signal line 103 respectively by the driving circuit (not shown) of the display device 100. At this time, the movable metal layer 1054 is expanded downward and contacts the immovable metal layer 1053 because of being attracted by the electric force induced from the electric field. Thus, the immovable metal layer 1053 is shorted with the movable metal layer 1054 and has the same electric potential with each other. Accordingly, the signals inputted into the second signal line 103 can be transmitted to the pixel electrode 106 through the immovable metal layer 1053. Moreover, the operation status of the display medium layer 12 is decided according to the signals transmitted to the pixel electrode 106.

On the other hand, when the voltage differential between the first metal layer 1051 and the movable metal layer 1054 is 0 V, the attracting force induced from the electric field between the first metal layer 1051 and the movable metal layer 1054 would disappear. At this time, the movable metal layer 1054 returns to the original status that is electrically insulated with the immovable metal layer 1053. Thus, the display status of the display device 100 is returned to the status at the time when the voltage applied to the first signal line 102 and the second signal line not yet.

Referring to FIG. 1 and FIG. 2, the display device 100 can achieve different display effects by controlling the operation status of the display medium layer 12 corresponding to each pixel region 104 by the MEMS switch 105. Since the MEMS switch 105 does not have the problems of carrier mobility and the on-off current ratio, the display performance of the display device 100 may be improved. Therefore, the use requests of the display device in new generation may be satisfied. Furthermore, the manufacturing process of the MEMS switch 105 is simpler than that of the amorphous thin film transistor, so that the manufacturing cost of the display device 100 may be reduced.

Figure 6:
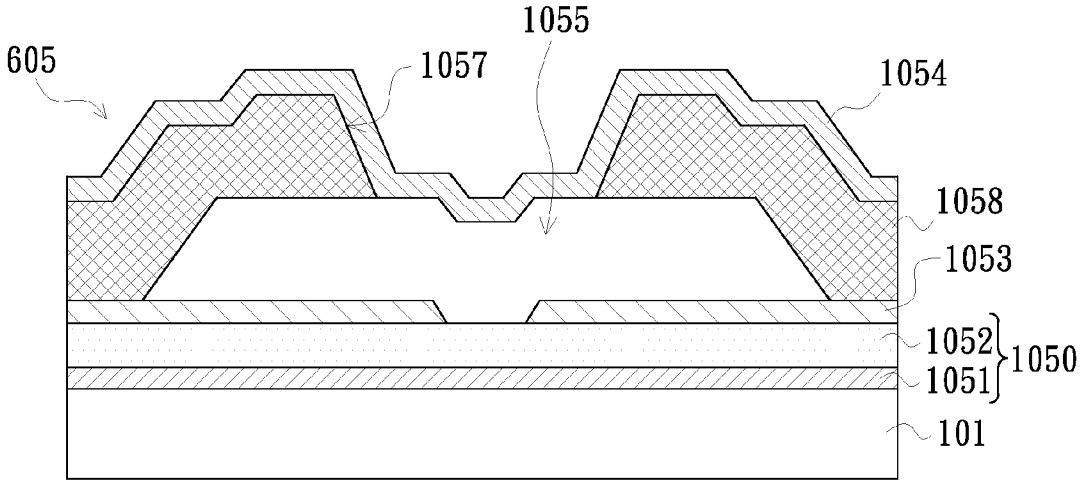
FIG. 6 is a schematic partial cross-section view of the MEMS array substrate according to another embodiment of the invention.

FIG. 6 is a schematic cross-section view of the MEMS switch according to another embodiment of the invention. Referring to FIG. 6, in the MEMS switch 605 of this embodiment, a supporting layer 1058 with an opening 1057 may be disposed between the movable metal layer 1054 and the immovable metal layer 1053. The movable metal layer 1054 is filled into the opening 1057, and the insulating cavity 1055 is formed between the supporting layer 1058 and the immovable metal layer 1053 and corresponding to the opening 1057.

Figure 7:
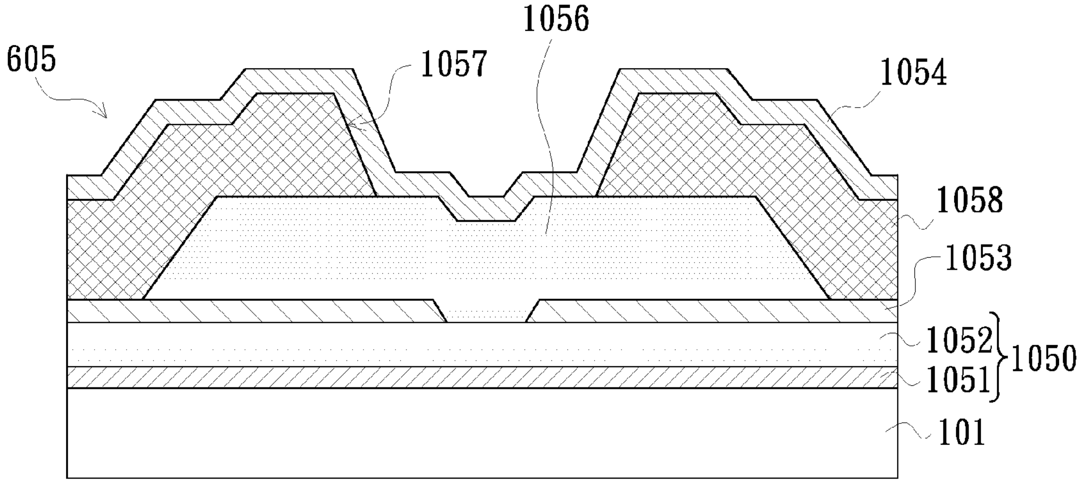
FIG. 7 is a schematic cross-section view of the MEMS switch shown in FIG. 6 during the manufacturing process thereof.

In detail, the MEMS switch 605 is formed by forming the first metal layer 1051, the insulating layer 1052, the immovable metal layer 1053 and the sacrificial layer 1056 on the substrate 101 sequentially first. Then, the supporting layer 1058 with the opening 1057 is formed on the sacrificial layer 1056 and the movable metal layer 1054 is formed on the supporting layer 1058 and filled into the opening 1057, as shown in FIG. 7. Later, the sacrificial layer 1056 is removed by gas etch, and thus the MEMS switch 605 shown in FIG. 6 is formed.

Referring to FIG. 1, FIG. 2 and FIG. 6, a voltage differential between the first metal layer 1051 electrically connected to the first signal line 102 and the movable metal layer 1054 electrically connected to the second signal line 103 resulted from applying voltage to the first signal line 102 and the second signal line 103 respectively by the driving circuit (not shown) of the display device 100. At this time, a portion of the movable metal layer 1054 filled into the opening 1057 is expanded downward and contacts the immovable metal layer 1053 because of being attracted by the electric force induced from the electric field. Thus, the immovable metal layer 1053 is shorted with the movable metal layer 1054 and has the same electric potential with each other. Accordingly, the signals inputted into the second signal line 103 can be transmitted to the pixel electrode 106 through the immovable metal layer 1053, and thus the display device 100 may display the predetermined images.

It should be noted that since the supporting layer 1058 is disposed between the movable metal layer 1054 and the immovable metal layer 1053 in this embodiment, the movable metal layer 1054 can be prevented from bending downward to electrically contact to the immovable metal layer 1053 when the voltage is applied to the first metal layer 1051 not yet. Therefore, the unusual operation of the display device 100 may be averted.

In summary, since the material of the MEMS switches is conductive, and the on/off status of the MEMS switches is operated by controlling electric field to make whether the metal layers disposed at different layer electrically connecting to each other or not, the MEMS switches would not have the problems about carrier mobility and the on-off current ratio. This shows that the display device uses the MEMS switches of the invention can increase the display performance thereof. Therefore, the requests in use of the display device in new generation would be satisfied.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A micro electro-mechanical system (MEMS) switch, comprising:

an active device including an insulating layer and a first metal layer disposed below the insulating layer;

an immovable metal layer disposed on the active device, the immovable metal layer being disposed above the first metal layer, the insulating layer being disposed between the immovable metal layer and the first metal layer; and a movable metal layer disposed above the immovable metal layer and driven by the active device, wherein an insulating cavity is formed between the immovable metal layer and the movable metal layer.

2. The MEMS switch as recited in claim 1, wherein material of the insulating layer comprises silicon oxide or silicon nitride.

3. The MEMS switch as recited in claim 1, wherein materials of the first metal layer comprise silver, chromium, alloys of molybdenum and chromium, alloys of aluminum and neodymium and nickel boride.

4. The MEMS switch as recited in claim 1, wherein materials of the immovable metal layer comprise silver, chromium, alloys of molybdenum and chromium, alloys of aluminum and neodymium and nickel boride.

5. The MEMS switch as recited in claim 1, wherein material of the movable metal layer is magnetic metal.

6. The MEMS switch as recited in claim 5, wherein material of the movable metal layer comprises nickel/alloys of aluminum and neodymium or nickel boride/alloys of aluminum and neodymium.

7. The MEMS switch as recited in claim 1, further comprises a supporting layer with an opening disposed between the immovable metal layer and the movable metal layer, the movable metal layer is filled into the opening and the insulating cavity is located between the supporting layer and the immovable metal layer and corresponds to the opening.

8. The MEMS switch as recited in claim 1, wherein the movable metal layer touches the immovable metal layer when the movable metal layer is driven by the first metal layer.

* * * * *